United States Patent
Iyer et al.

(10) Patent No.: US 9,635,166 B1
(45) Date of Patent: Apr. 25, 2017

(54) WORKFLOW MANAGEMENT AND CORRESPONDING INTEGRATED NOTIFICATION PROCESSING PLATFORM

(71) Applicant: West Corporation, Omaha, NE (US)

(72) Inventors: Raju Iyer, Atlanta, GA (US); Mark Edwards, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 14/842,262

(22) Filed: Sep. 1, 2015

(51) Int. Cl.
*H04M 3/00* (2006.01)
*H04M 1/725* (2006.01)
*H04M 3/51* (2006.01)
*H04L 12/58* (2006.01)

(52) U.S. Cl.
CPC ........ *H04M 1/72552* (2013.01); *H04L 51/14* (2013.01); *H04M 3/5191* (2013.01)

(58) Field of Classification Search
CPC ............. H04M 3/5183; H04M 3/5175; H04M 1/72552

USPC ....... 379/265.01–265.14, 266.01–266.1, 309
See application file for complete search history.

(56) References Cited

U.S. PATENT DOCUMENTS

| | | | |
|---|---|---|---|
| 8,407,049 B2* | 3/2013 | Cromack et al. | 704/235 |
| 2002/0138588 A1* | 9/2002 | Leeds | 709/217 |
| 2002/0178000 A1* | 11/2002 | Aktas et al. | 704/235 |
| 2005/0159959 A1* | 7/2005 | Benco et al. | 704/277 |
| 2009/0109961 A1* | 4/2009 | Garrison et al. | 370/352 |
| 2014/0100848 A1* | 4/2014 | Shaffer et al. | 704/240 |
| 2015/0373196 A1* | 12/2015 | Scott et al. | H04M 3/5175 |

* cited by examiner

*Primary Examiner* — William Deane, Jr.
(74) *Attorney, Agent, or Firm* — Raffi Gostanian

(57) ABSTRACT

Customer orders and other service related events require multiple operations to fulfill and process. One example may include receiving a request message from a user device, identifying the request message as being a particular message type, pre-processing the request message to identify message content, and forwarding the identified message content to an active user interface. The request may be identified as a service request and processed by multiple entities prior to fulfilling the request(s).

21 Claims, 14 Drawing Sheets

WORKFLOW MANAGEMENT AND CORRESPONDING INTEGRATED NOTIFICATION PROCESSING PLATFORM

TECHNICAL FIELD OF THE APPLICATION

This application relates to a configuration and procedure for processing work orders, messaging, notifications and related information flows and more specifically to a configuration and procedure of assigning work orders and integrating various communication platforms and mediums into an individual user interface.

BACKGROUND OF THE APPLICATION

Conventionally, when customer work orders or related work matters arrive and are entered either manually or automatically into the database system of an enterprise computer network, the work must be delegated, updated and finalized in a timely manner to ensure optimal customer satisfaction.

In one example, work orders are received and delegated according to availability of working employees, employee groups or other internal work communities. The work orders may also be updated and passed on to different members of different groups thus complicating the process and requiring adequate updates to occur so all employees have access to the most updated information. There are limits on the employee's ability to identify a customer's requests in real-time and other updates related to those requests. Also, the communication between an internal employee and a customer is often limited to one interaction (i.e., phone call), or more commonly an email communication which may be regarded as non-personal and non-satisfactory to certain customers.

SUMMARY OF THE APPLICATION

One example embodiment of the present application may provide a method that includes at least one of receiving a request message from a user device, identifying the request message as being a particular message type, pre-processing the request message to identify message content, and forwarding the identified message content to an active user interface.

Another example embodiment includes an apparatus that includes at least one of a receiver configured to receive a request message from a user device, a processor configured to identify the request message as being a particular message type, pre-process the request message to identify message content, and a transmitter configured to transmit the identified message content to an active user interface.

Another example embodiment includes a non-transitory computer readable storage medium configured to store instructions that when executed cause a processor to perform at least one of receiving a request message from a user device, identifying the request message as being a particular message type, pre-processing the request message to identify message content, and forwarding the identified message content to an active user interface.

Another example embodiment may include a method that includes at least one receiving a work order in a workflow management application, storing the work order in the workflow management application memory, generating at least one notification message, transmitting the at least one notification message to an active user interface associated with at least one queue among a plurality of queues of the workflow management application, and updating the workflow management memory to identify at least one change to the work order.

Still another example embodiment may include an apparatus that includes at least one of a receiver configured to receive a work order in a workflow management application, a memory configured to store the work order, a processor configured to generate at least one notification message, and a transmitter configured to transmit the at least one notification message to an active user interface associated with at least one queue among a plurality of queues of the workflow management application, and wherein the processor is further configured to update the workflow management memory to identify at least one change to the work order.

Another example embodiment may include a non-transitory computer readable storage medium configured to store instructions that when executed causes a processor to perform at least one of receiving a work order in a workflow management application, storing the work order in the workflow management application memory, generating at least one notification message, transmitting the at least one notification message to an active user interface associated with at least one queue among a plurality of queues of the workflow management application, and updating the workflow management memory to identify at least one change to the work order.

BRIEF DESCRIPTION OF THE DRAWINGS

FIG. 3C illustrates an example user interface for performing a communication message test for the information records according to example embodiments of the present application.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
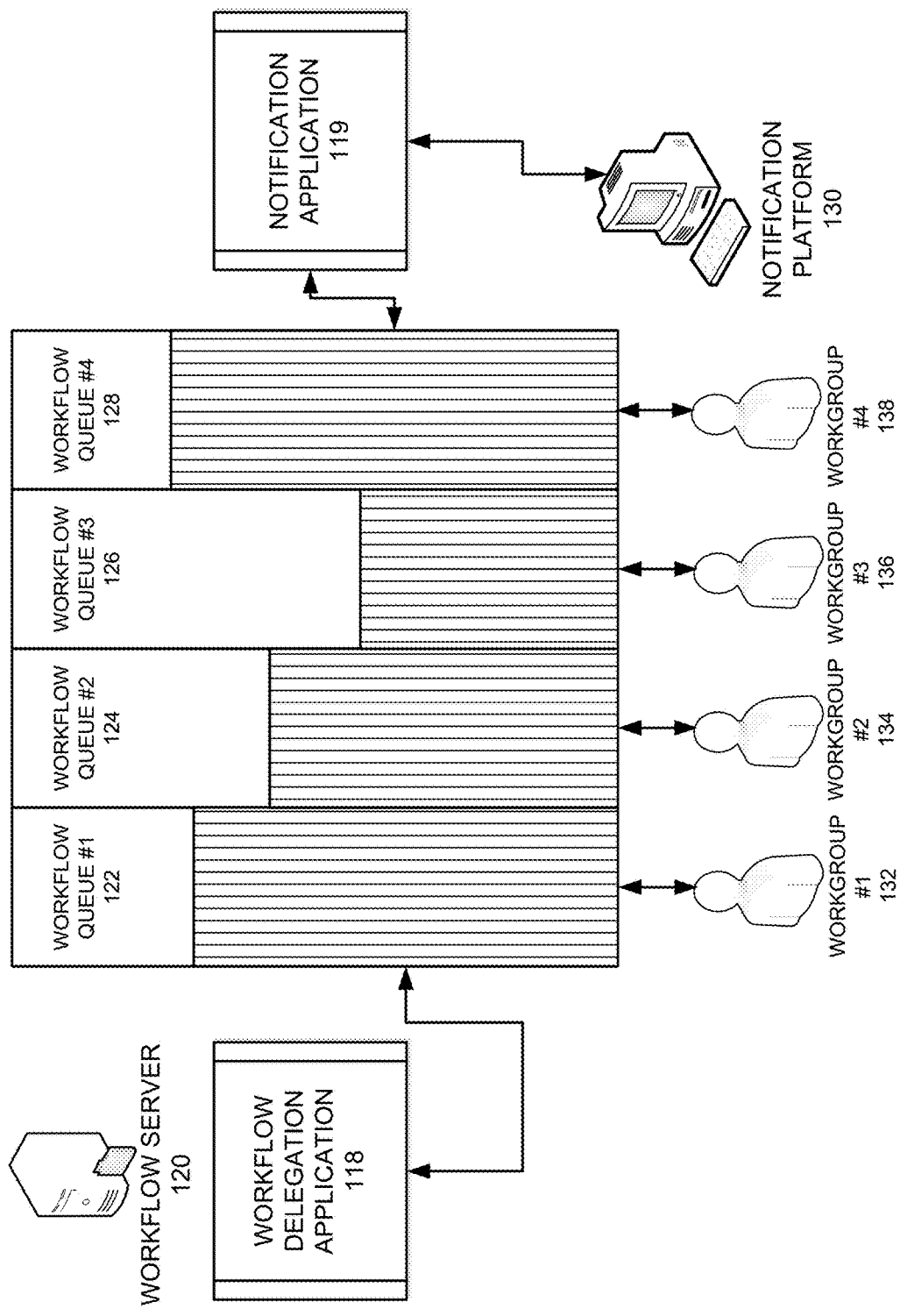
FIG. 1 illustrates an example workflow queue and delegation diagram according to example embodiments of the present application.

FIG. 1 illustrates an example workflow queue and workflow delegation diagram according to example embodiments of the present application. Referring to FIG. 1, the workflow configuration 100 may be utilized by an enterprise or company model to autonomously process sales calls and orders, customer service calls and orders and/or other automated business functions. In the workflow, the work instances, messages or records may be assigned to queues 122-128 as they are received and processed by a server/database. The orders are in-turn configured to be assigned as work units or messages to certain employee workstations and/or workgroups 132-138 of employee workstations, etc.

According to one example, the workflow for a single work unit may progress from queue to queue as it is managed by the workflow delegation application 118 operating on the workflow server 120. The changes and movement of the workflow may invoke emails to be generated automatically and/or manually at every step of the queue processing configuration. For instance, a new customer account may be setup at a first stage of the process and may be processed by queue 122 and a corresponding member/workstation of workgroup 132. The account may be accessible at which point the workflow application 118 may initiate an email be sent to an available member of group 134 (i.e. billing). The billing procedures may be setup and another email may be generated to inform group 136 to setup a free promotion or other subscription options and then another email may be sent to group 138 to follow-up with the user to answer any questions. The updates and messaging may be managed by a separate notification application 119 and corresponding platform 130 all of which are part of a workflow server 120 and/or the various queues.

According to another example, the workflow processing of FIG. 1 may be enacted by providing a plurality of communication options and preferences. Alternatives to an email platform may include a short message service (SMS) communication model, a voice communication model and a combination of one or more of the email, the SMS message and/or voice communication mediums. For instance, by using two-way SMS text messaging and/or a voice call that converts the text received into speech and plays it to the recipient, the information flow may be customized to the preferences of the enterprise representative 'employee' or the preferences of the customer. In any case, the responses and messages are persisted as part of the workflow.

During the workflow processing, the notification generation process can be automated. The workflow/trigger combination that creates the notifications can be configured by users who have the proper authority (e.g. administrators), then any subsequent records that match the set criteria will have the notifications automatically generated. In operation, the SMS and/or voice notifications are automatically sent when the requirements of the workflow are met. The message may be sent via API's from a workflow platform (i.e., SALESFORCE), and by consuming API's from the interactive services platform.

In one example operation, assume a discount for a product or service is to be applied to an active order. An approval process may be necessary to approve the discount. However, instead of waiting for the proper authority personnel to approve the order, the order could simply be ported to another account workstation that is managed by an administrator with the authority to approve such a modification/discount. Each queue could be linked to another tier of management so no live interaction is required at any particular time. As a result, the forwarding of the work order from queue to the next 122 to 124 to 126 to 128 could occur automatically via the workflow delegation application 118. Also, corresponding messages and notifications can be sent to the workstations of the customer, the administrator, and/or the authority personnel, etc.

A workflow template can be retrieved and processed to apply various conditions. For example, when a discount is 10% or less then the approval of a "Director" may be required. For a discount of 20% then a vice president may be required, and for a 30% discount then maybe a senior vice president or even a legal representative.

Figure 2:
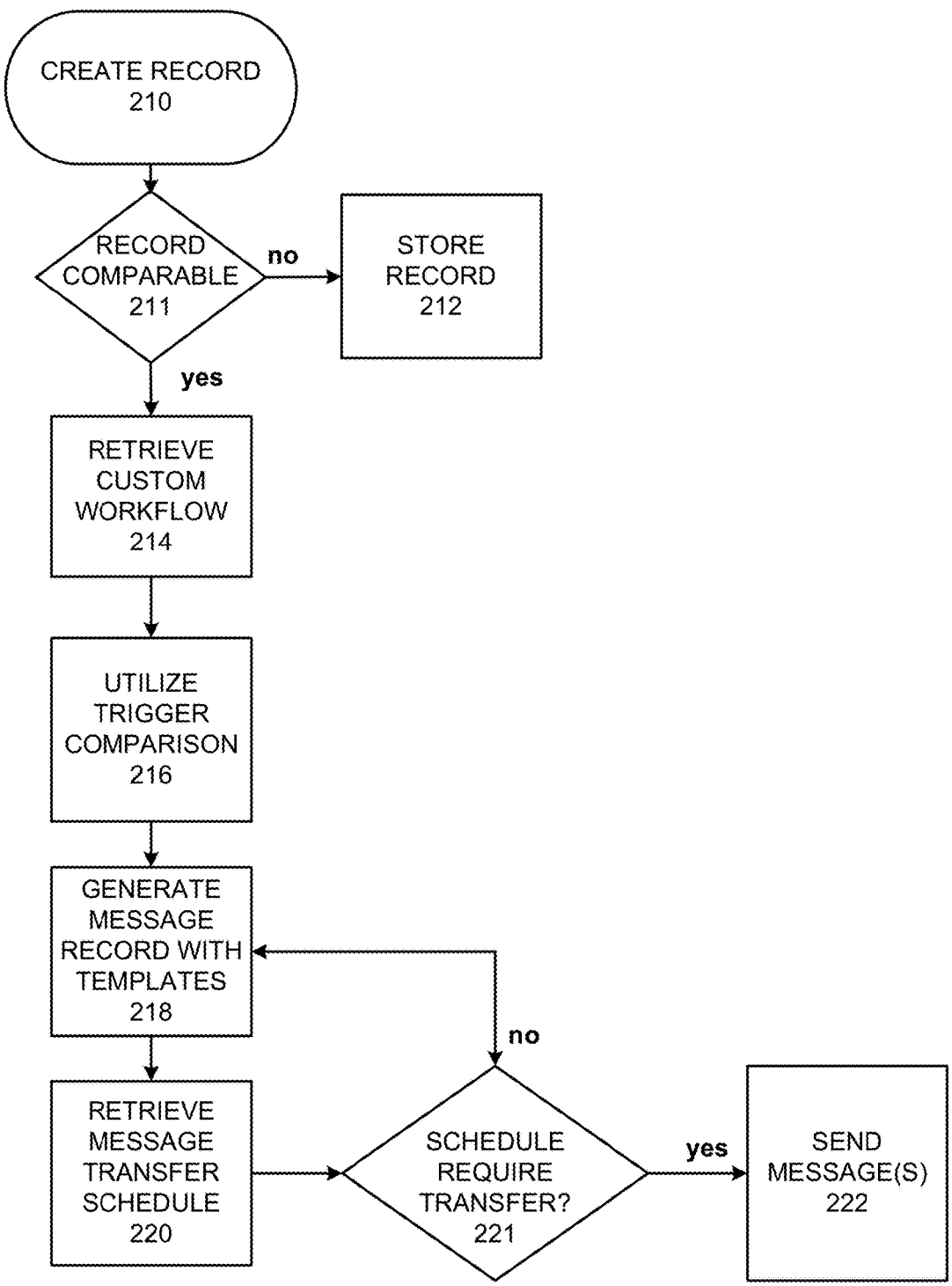
FIG. 2 illustrates an example logic flow diagram according to example embodiments.

FIG. 2 illustrates an example logic flow diagram according to example embodiments. Referring to FIG. 2, the diagram 200 begins with the creation of a record 210 which could be a new customer account, a work order of any kind or any record that is utilized by a workflow processing configuration such as the example in FIG. 1. Customer support is one example scenario that could be utilized by the example embodiments. If someone has trouble with a call, or a customer service team opens a case of an active record, the case will be processed by following a defined workflow process by routing to various workflow tiers 1, 2, 3, 4 . . . n etc. At the end of a workflow process, the customer will hear back on the result of their case. As the case proceeds through the queues in the workflow, notifications will be created and transmitted and the notifications can include email, SMS and/or voice communications.

The record that is created is identified and processed to be compared 211 to a custom workflow template. If the record is not comparable it is stored until it can be processed later. If the record is comparable a workflow that compares to the record is retrieved 214 and utilized for a trigger comparison 216 to perform trigger actions, trigger notifications or other trigger operations that further the workflow. A message is then generated and the templates 218 are used to process the work record. A message transfer schedule 220 may be retrieved to identify persons, addresses, times that require the message transfers. If a schedule requires a transfer 221 the message is sent 222, if not then the message is stored until a scheduled time and destination are identified.

As orders are moved from one queue to the next, the information added or appended to the record could be merged to include various levels of appendage. For instance, each queue process of a record may include another appendage to the overall message flow. As a result, the message that is processed and transmitted to a next level of the queue will include at least one additional message appendix that was not included on the previous processing step. For instance, a record may include an original message content then as the message is transmitted to a next queue, the message content may include message content+queue one processing information. Then the next, queue may add queue two processing information that is collectively part of the record as it arrives in queue three.

According to another example embodiment, lead management operations could utilize the present workflow to perform similar procedures. In fact, the workflow examples may be incorporated into any custom data model that users utilize on the computing sales and support platform. For instance, the application could be used for outage notifications, provisioning notifications, invoicing, bill dues dates, etc., if the customer's organization was configured for such functions.

The record may be a placeholder for information about the message (SMS and/or Voice), and may include the message body, the response, the disposition, time sent, port times, status new, sent, failed etc. The operation of the trigger evaluating a workflow calls a comparison between the record being saved, and the custom workflow. If the workflow criteria is met, a message record is created. If the criteria is not met, no message will be sent and no record is created. Messages are generated and sent at certain time intervals. In operation, if a lead is created that meets the workflow criteria and is supposed to be sent a welcome text, then it will take a set amount of time for the schedulable class to send out the text message to the user. For instance, if a user signs up on an online access application and 10 minutes later receives a 'thanks for your interest' text.

With the workflow process and the merge field capabilities, there are numerous possibilities for workflow integration. For example, a welcome call may be generated and transmitted to all new users along with case status updates for every new comment, notifications of approval requests, or whatever the end customer decides to use to communicate with the service center.

Figure 3A:
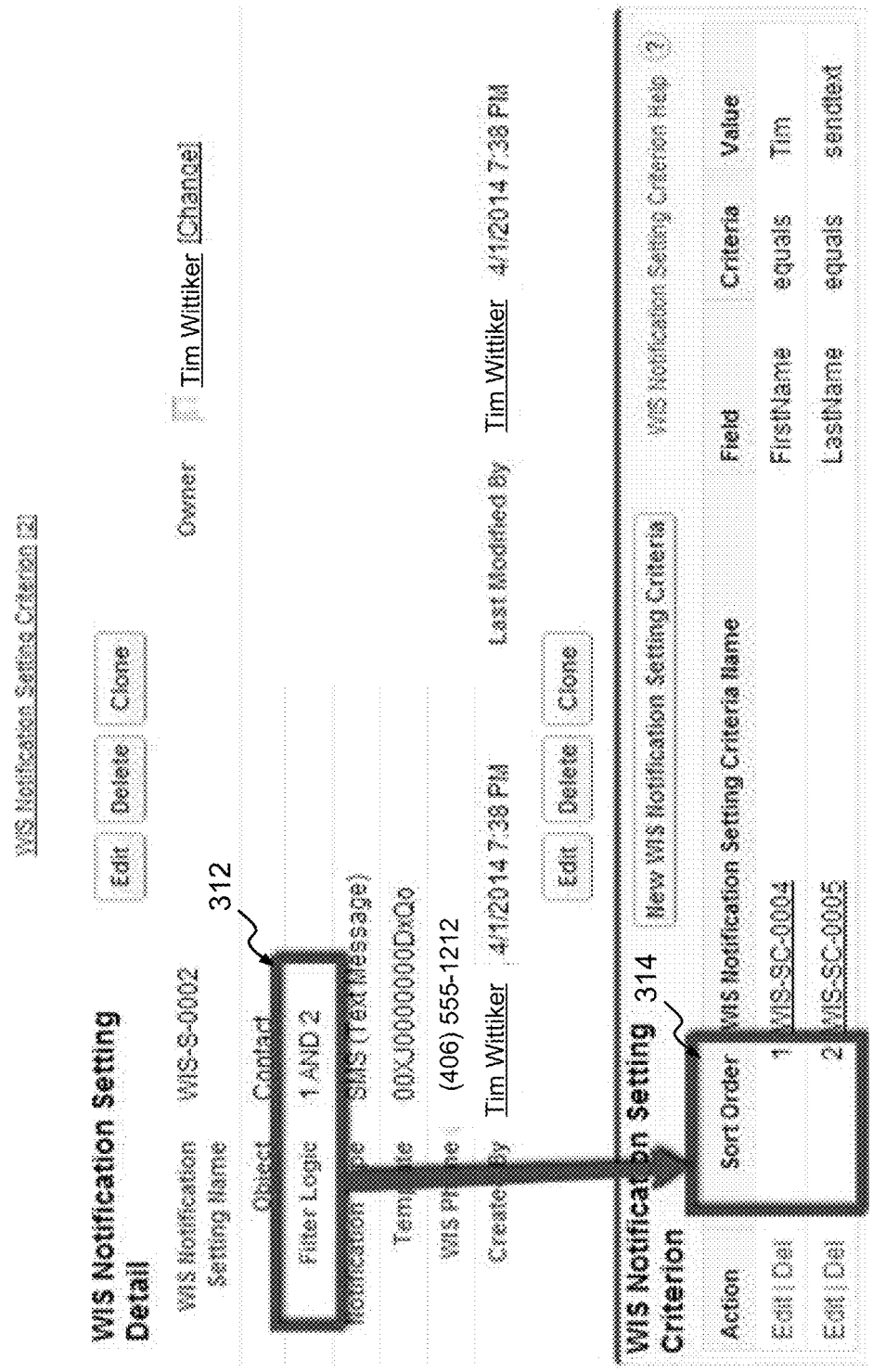
FIG. 3A illustrates an example user interface for managing the information records according to example embodiments of the present application.

FIG. 3A illustrates an example user interface for managing the information records according to example embodiments of the present application. Referring to FIG. 3A, the user interface 300 provides the user with access to a notification setting configuration. The filter logic 312 may provide a way to include various notifications on the same notification setup procedure. If a first name and last name=the value illustrated, then a notification may be sent. For example, when a user is traveling and can't respond, the user can send a notification and receive approval/disapproval from a user, via their device, for a request and thus will not have to wait for the response.

Figure 3B:
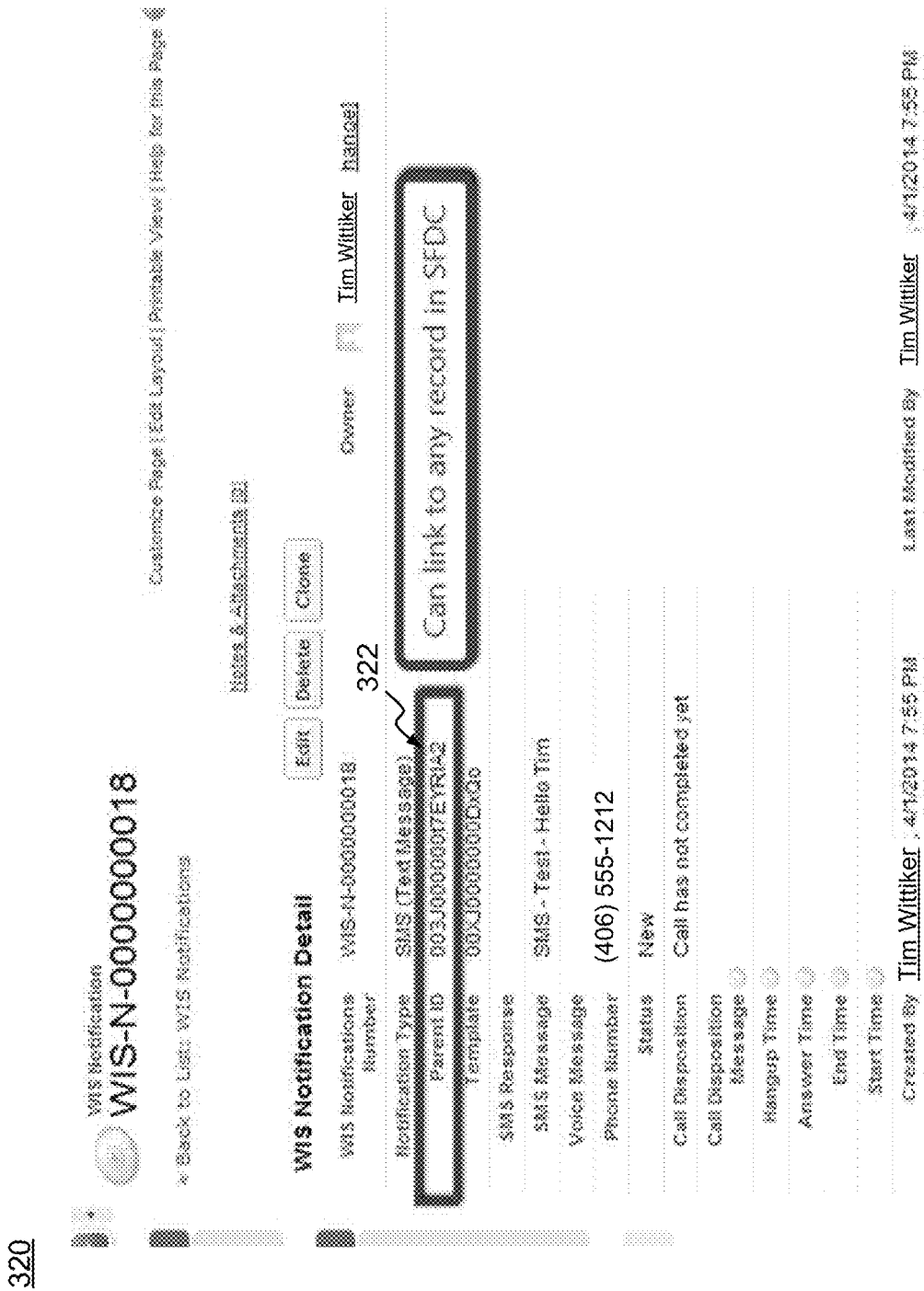
FIG. 3B illustrates an example user interface for managing the information record details according to example embodiments of the present application.

FIG. 3B illustrates an example user interface for managing the information record details according to example embodiments of the present application. Referring to FIG. 3B, the user interface 320 includes a particular record identifier 322 and the various fields associated with that record. Any of the fields may be referenced by a database application to obtain and access the record for workflow processing and corresponding notification setup procedures. In this interface, the notification that is going to be sent to the parent event is linked. For example, assuming an expense report needs to be sent, the expense report is linked to a notification that needs to be sent to a user workstation, such as a decision maker entity. So when a decision maker affirms the order, then the application event processing system can link the "OK" to the expense report and append the update (i.e., "OK" via workstation identifier XYZ, etc.) to the order so the next processing queue can identify the updates as the order progresses.

Figure 3C:
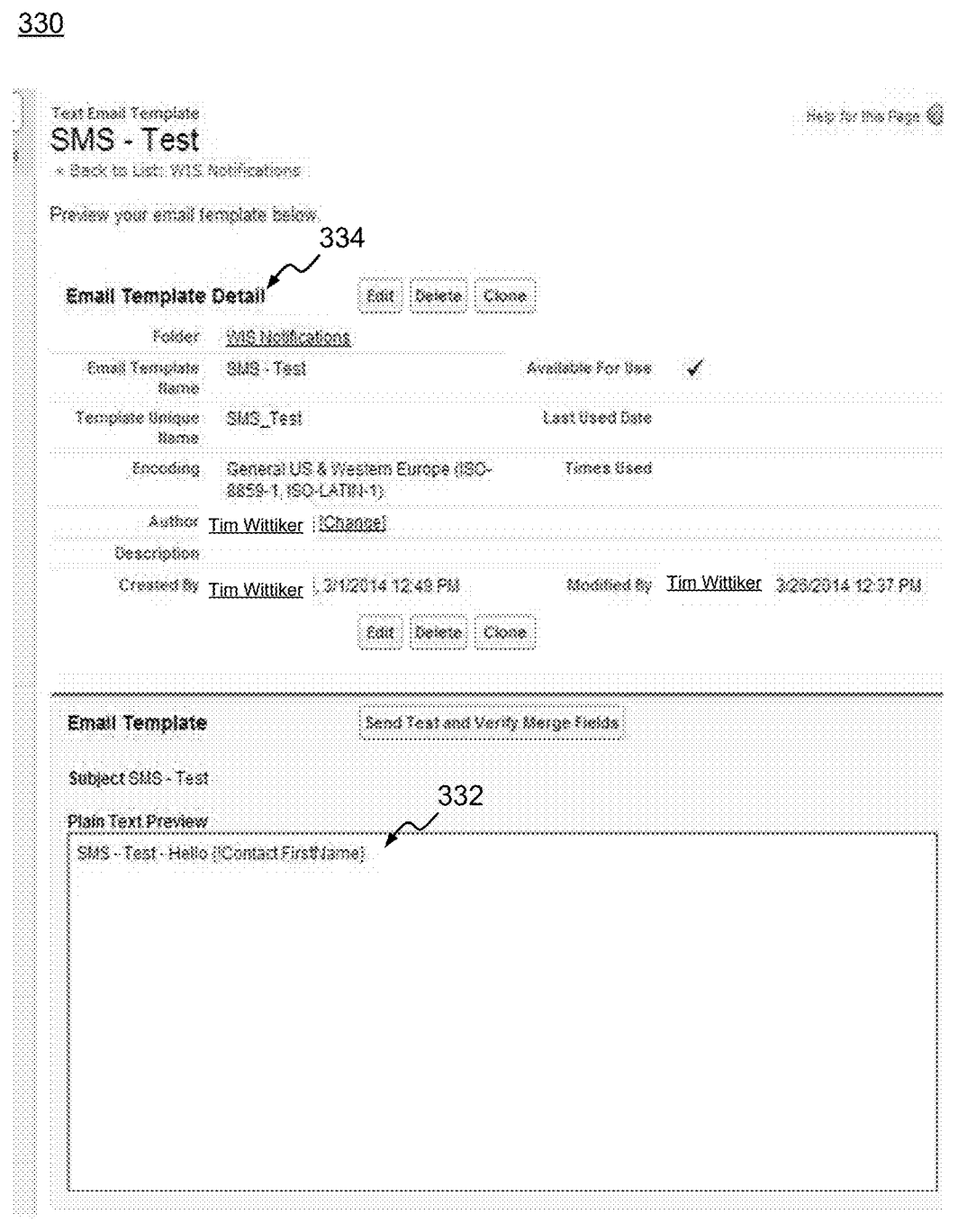

FIG. 3C illustrates an example user interface for performing a communication message test for the information records according to example embodiments of the present application. Referring to FIG. 3C, the user interface 330 includes an email template configuration 334 with an email author and other metadata to track the email creation. The email content is illustrated in the email template section 332. This example provides an email template however there is also a text template (not shown) that can be used by the decision maker workstation or current workstation for responding to a recent request or pending requirement of the present queue.

Figure 3D:
FIG. 3D illustrates an example user interface for managing the information records according to example embodiments of the present application.

FIG. 3D illustrates an example user interface for managing the information records according to example embodiments of the present application. Referring to FIG. 3D, the interface 340 include an example feed 352 of various SMS messages that were send and processed by the workflow. In this example, an acknowledgement can be created and sent to acknowledge the messages sent and the particular workflow arrangement associated with the messages sent (i.e., workflow history, status, etc.).

Figure 4:
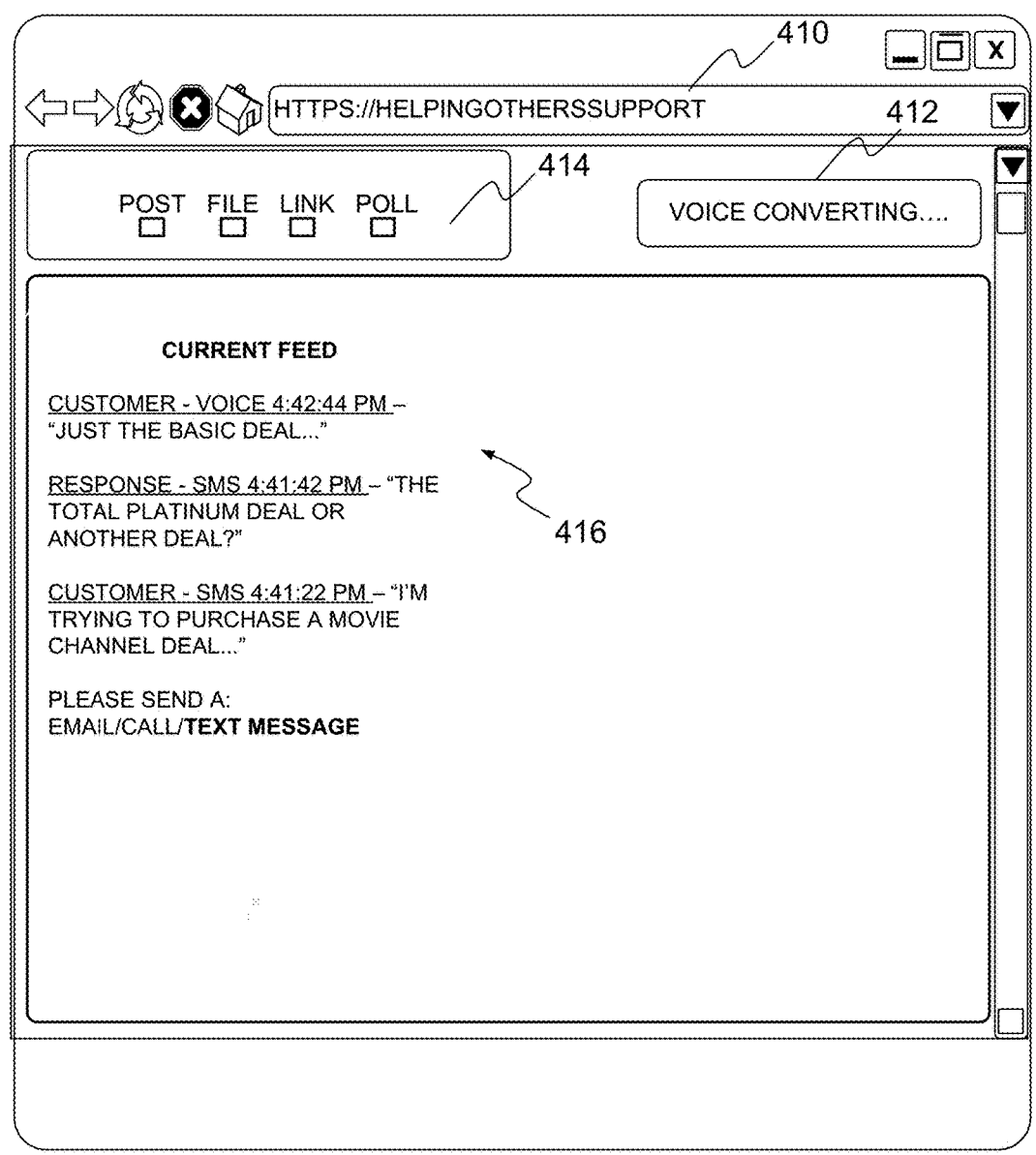
FIG. 4 illustrates an example user interface of a web-based application according to example embodiments of the present application.

FIG. 4 illustrates an example user interface of a web-based application according to example embodiments of the present application. Referring to FIG. 4, in this interface 400 the web browser based application may include a URL 410, a status window 412 and a set of options 414. A user may be accessing a current feed 416 of an open work order which may include voice messages, SMS messages, phone calls that were since converted to text for processing. In this example, the user voice was pre-processed to identify a user action or request prior to a complete processing procedure to optimize the customer feedback options.

Figure 5A:
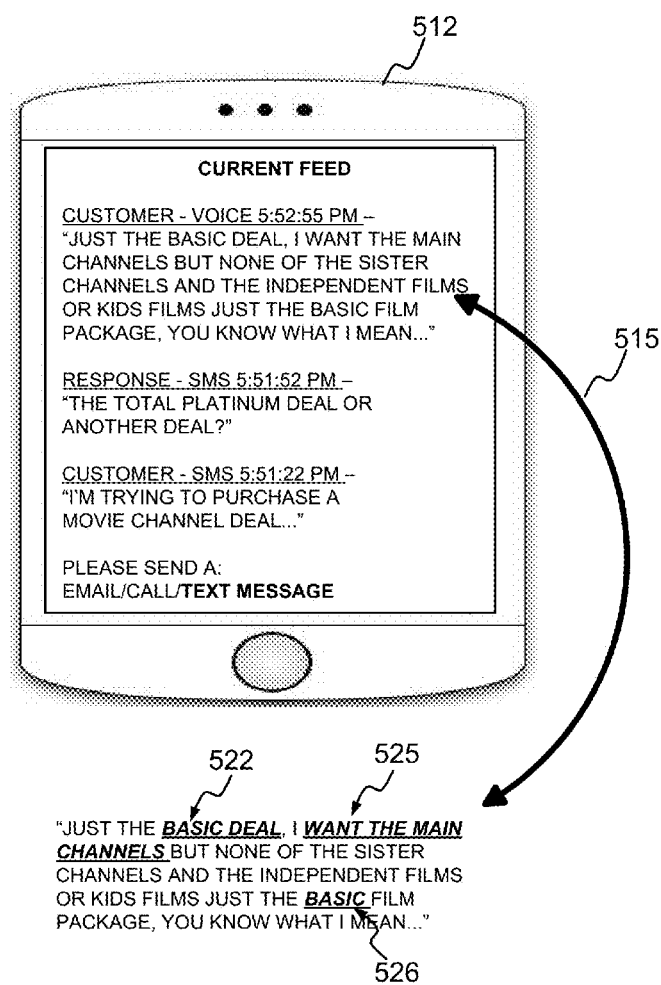
FIG. 5A illustrates an example user interface of a smartphone based application according to example embodiments of the present application.

FIG. 5A illustrates an example user interface of a smartphone based application according to example embodiments of the present application. Referring to FIG. 5A, the example 500 includes the same feed from FIG. 4 displayed on a user device 512. The voice message may be received by recording the customer's voice and selection options and transferring 515 the data to a parsing engine which converts the voice to text and quickly identifies keyword phrases from a known library and is able to identify the customer's request before the call is even finished. This information may be quickly updated on the user interface of the customer service representative with highlights, bolding, underlining, matching examples, etc. to flag the representative to quickly identify the customer's requests. The keywords of interest as matched to the predetermined library may include 522 "basic deal", 524 "want", "channels", 526 "basic", etc., which are all recognized by the parser as terms relating to a cable television package the customer is attempting to purchase as an ongoing service.

Figure 5B:
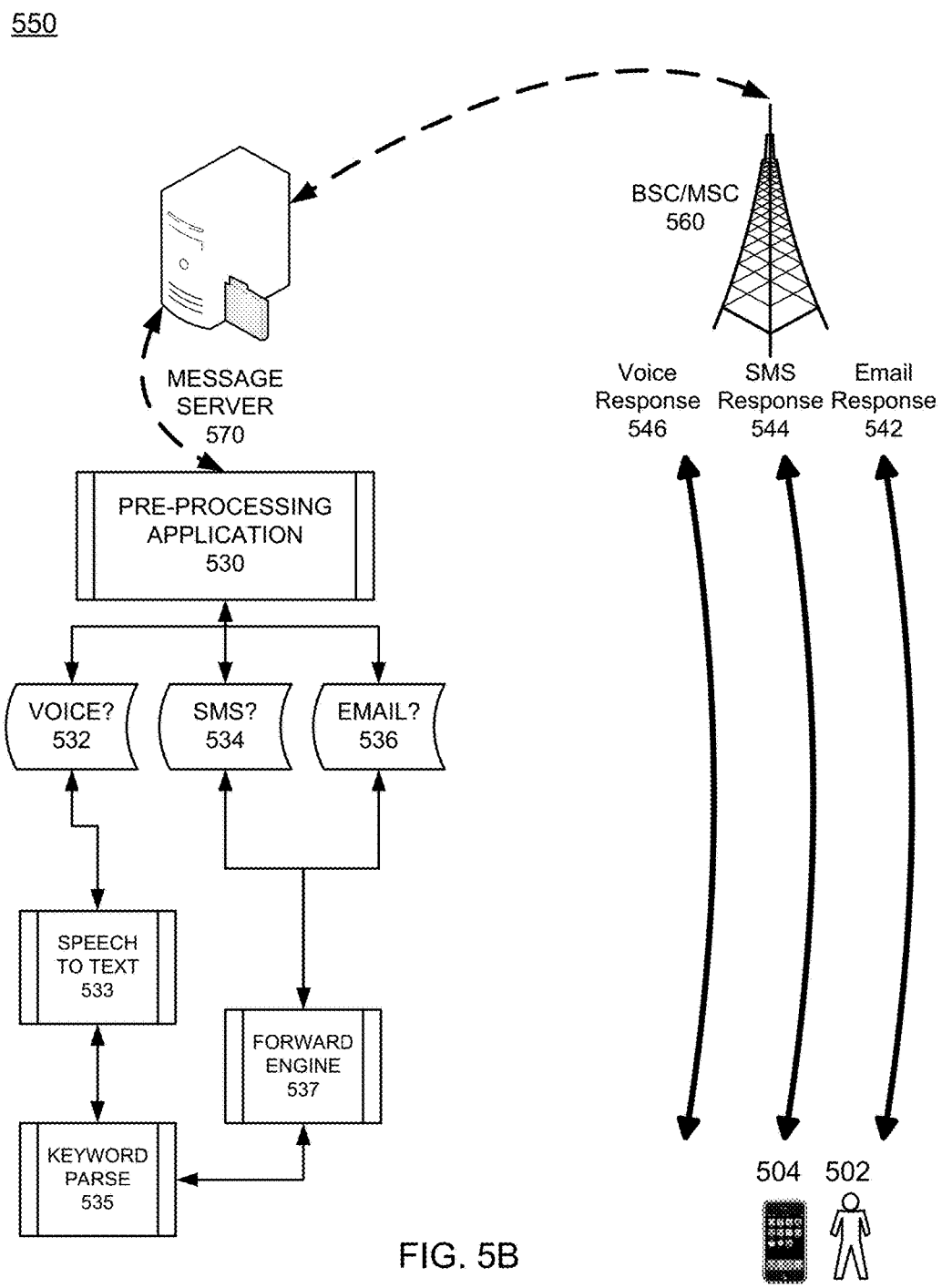
FIG. 5B illustrates an example communication network flow example according to example embodiments of the present application.

FIG. 5B illustrates an example communication network flow example according to example embodiments of the present application. Referring to FIG. 5B, the communication process with a customer 502 operating a mobile device 504 may include any of voice responses 546, SMS responses 544 and email responses 542. The mobile communication network may receive those messages at a base station (BSC/MSC) 560 and forward them to a message server 570 for immediate processing, pre-processing, etc. In this example, the pre-processing application 530 may receive content while the data is being transferred or contemporaneous with a recent message forwarding event. The initial determination may include identifying whether the message is voice 532, SMS 534 and/or email 536. If the message data is voice, the speech must be converted to text 533 and pre-processed to parse the relevant information 535 and forward 537 that information to a customer support center or user interface so the representative can address the user's needs in real-time. The SMS and email information can be forwarded to the user interface without pre-processing or may also undergo a parsing function to identify the purpose of such messages similar to the voice information.

Figure 6:
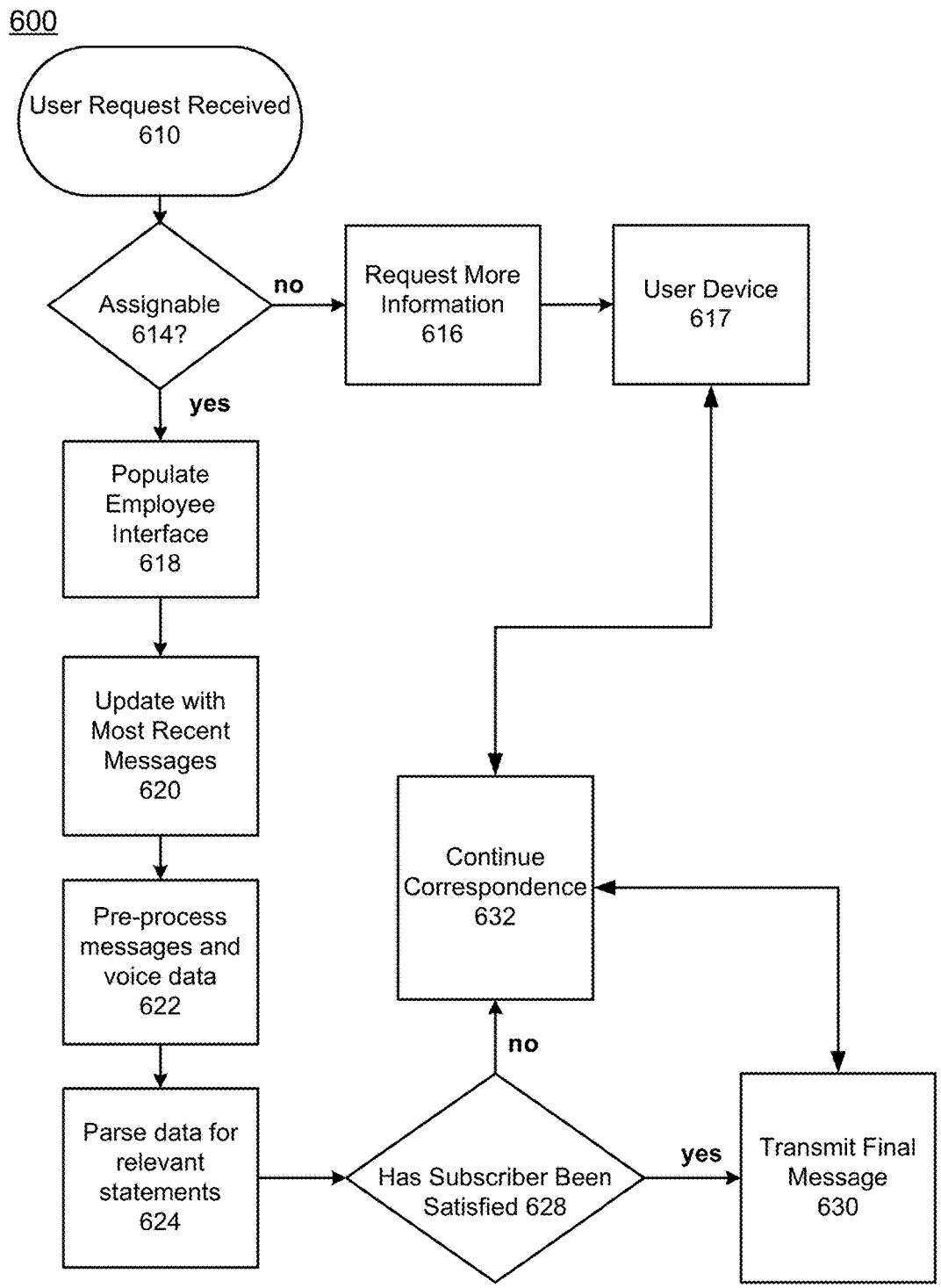
FIG. 6 illustrates a logic flow diagram of a customer communication operation according to example embodiments.

FIG. 6 illustrates a logic flow diagram of a customer communication operation according to example embodiments. Referring to FIG. 6, the flow diagram 600 includes an example of processing user requests and communicating between a user device and a service center representative interface. The request may be received 610 and identified 614 as either assignable or not assignable. The non-assignable requests invoke additional questions 616 which are sent to a user device 617 to continue a correspondences 632 until assignment can be performed. The employee user interface 618 may be populated with data as it becomes available. Most recent messages may be incorporated into the user interface for update purposes 620. The messages may be pre-processed to identify relevant information 622, which can be parsed 624 and forwarded to the representative on the fly. Once subscriber satisfaction has been confirmed via the messaging, word parsing, etc., the final message may be transmitted to consummate the discussion 630.

Figure 7A:
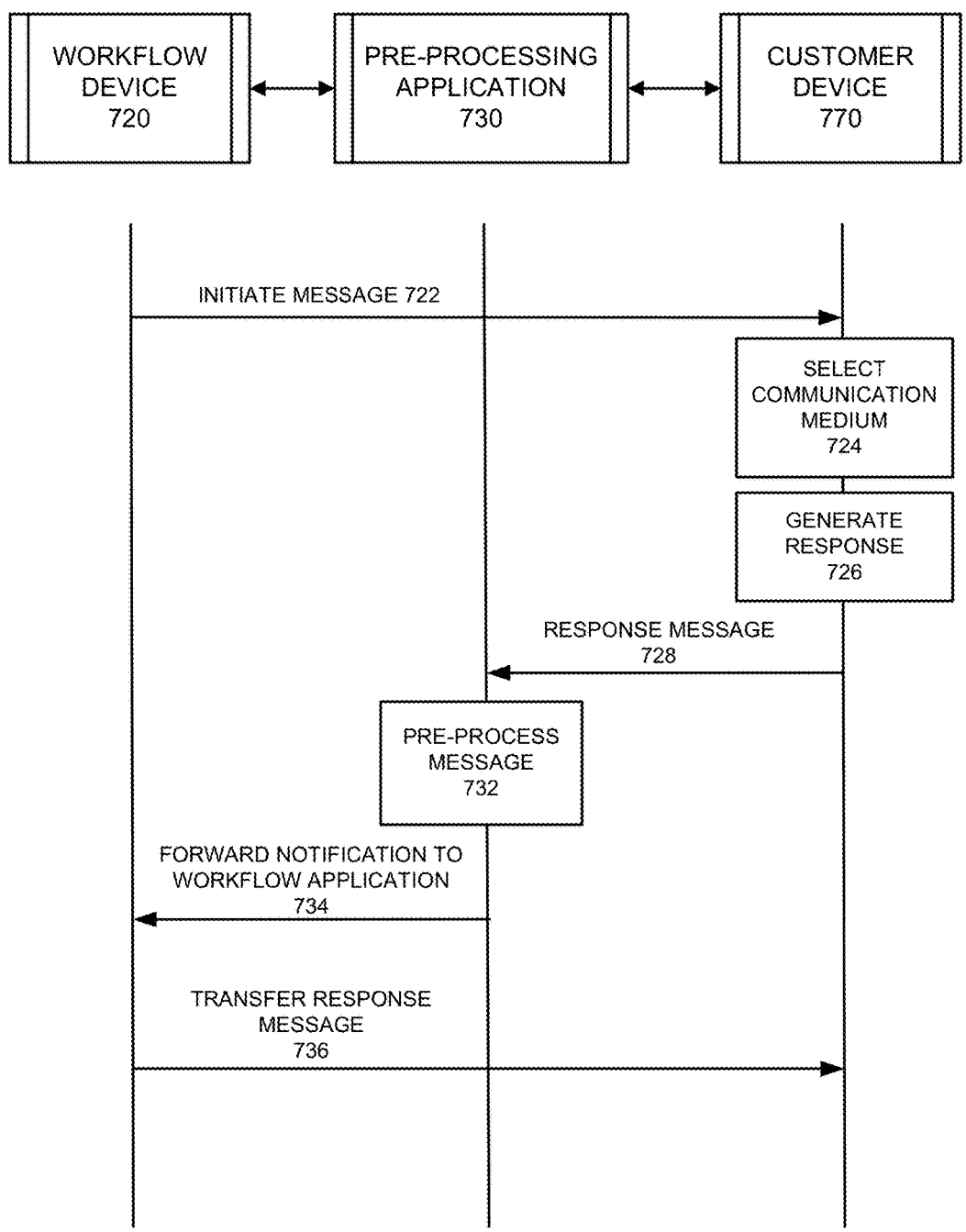
FIG. 7A illustrates an example system communication diagram of the communication between the workflow processing device, the message processing application and the end user customer device according to example embodiments.

FIG. 7A illustrates an example system communication diagram of the communication between the workflow processing device, the message processing application and the end user customer device according to example embodiments. Referring to FIG. 7A, the communication flow may include a workflow device 720 being operated by a workflow employee or customer service representative may receive messages and forward them to a pre-processing application 730 which performs an initial determination as to the type and the content of the request. As a result, a corresponding internal or workflow message may be initiated 722 from the workflow device and sent to another workflow device internally or to a customer device 770 to respond to a customer inquiry. The customer may then select any communication medium that is preferred 724 and respond accordingly 726. The response message 728 may be pre-processed 732 as well to identify the customer's concerns or desires and to see if the information is relevant and whether it should be parsed and presented to the user interface active on the workflow device 720. The message may be forwarded 734 to the user interface active on the workflow device 720, which may respond by transferring a response message 736 depending on the content of the message or the user action performed by the workflow administrator.

Figure 7B:
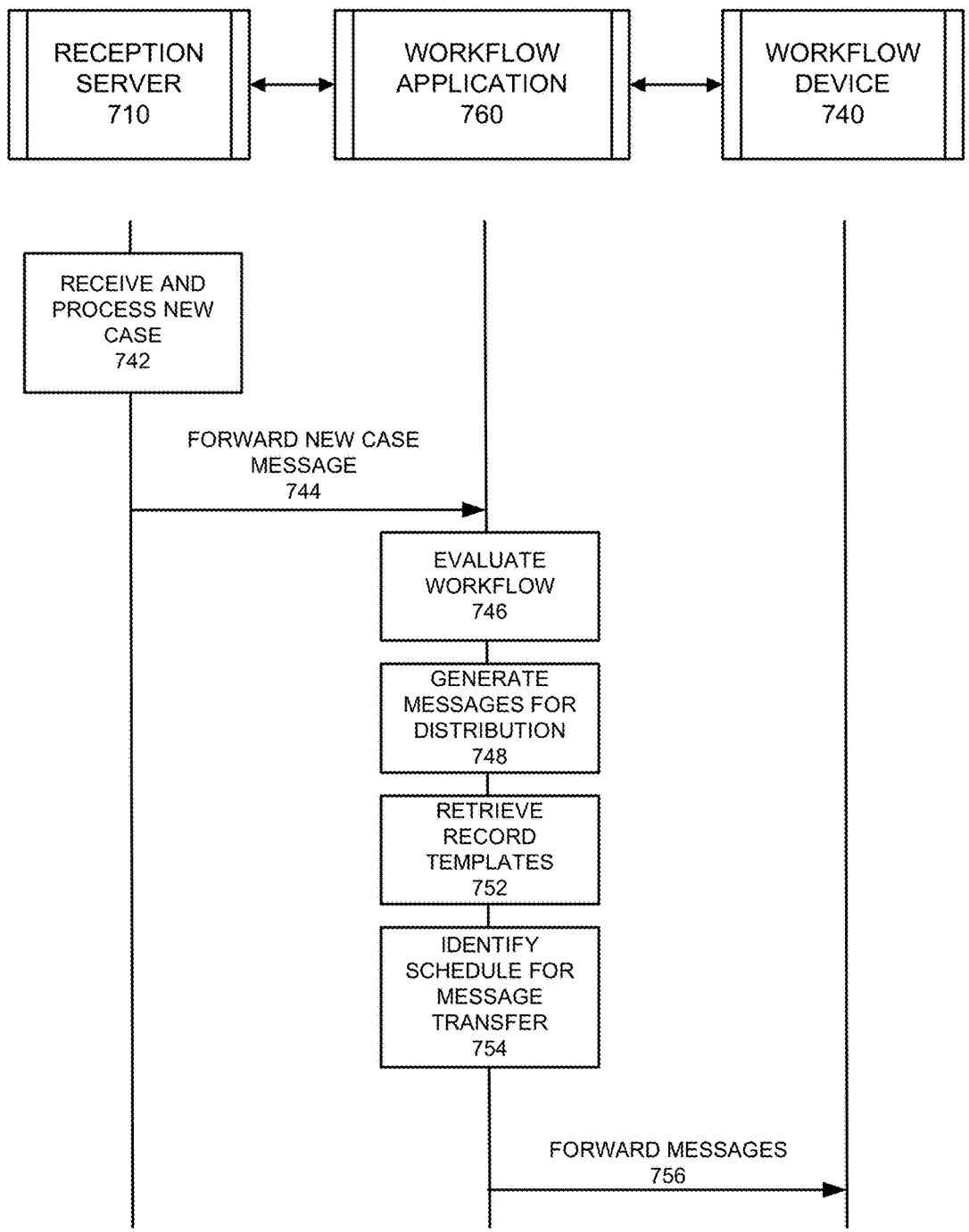
FIG. 7B illustrates an example system communication diagram of the communication between the workflow server, the workflow processing application and the internal workflow device according to example embodiments.

FIG. 7B illustrates an example system communication diagram of the communication between the workflow server, the workflow processing application and the internal workflow device according to example embodiments. Referring to FIG. 7B, the reception server 710 may be configured to receive and process a new work order or work case 742 based on a new account or other action that initiates such a new work order to be created. The workflow application 760 may receive a forwarded new case message 744 and evaluate the content of the new case against a known template or other guideline for processing the work flow. The application 760 may then generate messages for distribution 748 and retrieve a record template 752 for comparison purposes. The processed workflow and work case are then setup for notifications to be generated at each stage of the workflow process. A schedule may be identified for a message transfer 754 and the forwarded messages are sent to other workflow devices 740 which are in different departments for workflow queue management purposes.

Continuing with the same example, an example method may include receiving a request message from a user device, such as a request to have a certain service or modification to an existing service or product. One example may include transmitting a text message to a cable television service for a new content package subscription including words and terms associated with user requested content (i.e., pay-per-view, HBO, etc.). The message may be identified as being a particular message type, such as SMS, email, phone call message, voice recording, etc. Next, the request message is pre-processed to identify message content, and the identified message content can be forwarded to an active user interface.

The method may further include parsing a message content of the message to identify at least one phrase of interest and forwarding the phrase of interest to the active user interface. The phrase of interest can be preliminarily compared to a library stored in memory to identify a link to some alias term in the library which applies to that particular service provider. This phrase of interest can then be the basis for communicating with the subscriber/customer device and initiating a communication session. In another example, an ongoing call can be identified from the user device, and the voice data from the ongoing call can be converted to text. Next, the text can be pre-processed to identify at least one phrase of interest similar to the above-noted example. The phrase of interest can be forwarded to the active user interface during the ongoing call. A library including terms and phrases can then be retrieved and the phrase of interest can be compared to the library terms and phrases to identify at least one match between the phrase of interest and the terms and phrases of the library. As a result, at least one active offer can be retrieved from memory and associated with the match. Next, an offer message can be crated with the at least one active offer that relates to the phrase of interest. The offer message can then be transmitted to the user device and a feedback message will be received from the user device responsive to transmitting the offer message. The feedback message can then be parsed to identify an agreement or a disagreement with the at least one active offer (i.e., user accepted, user did not accept, user questions, etc.) and a response message can be created with a service suggestion associated with the active offer. The phrase of interest can be one or more terms that are linked to one or more terms in the library.

Figure 8:
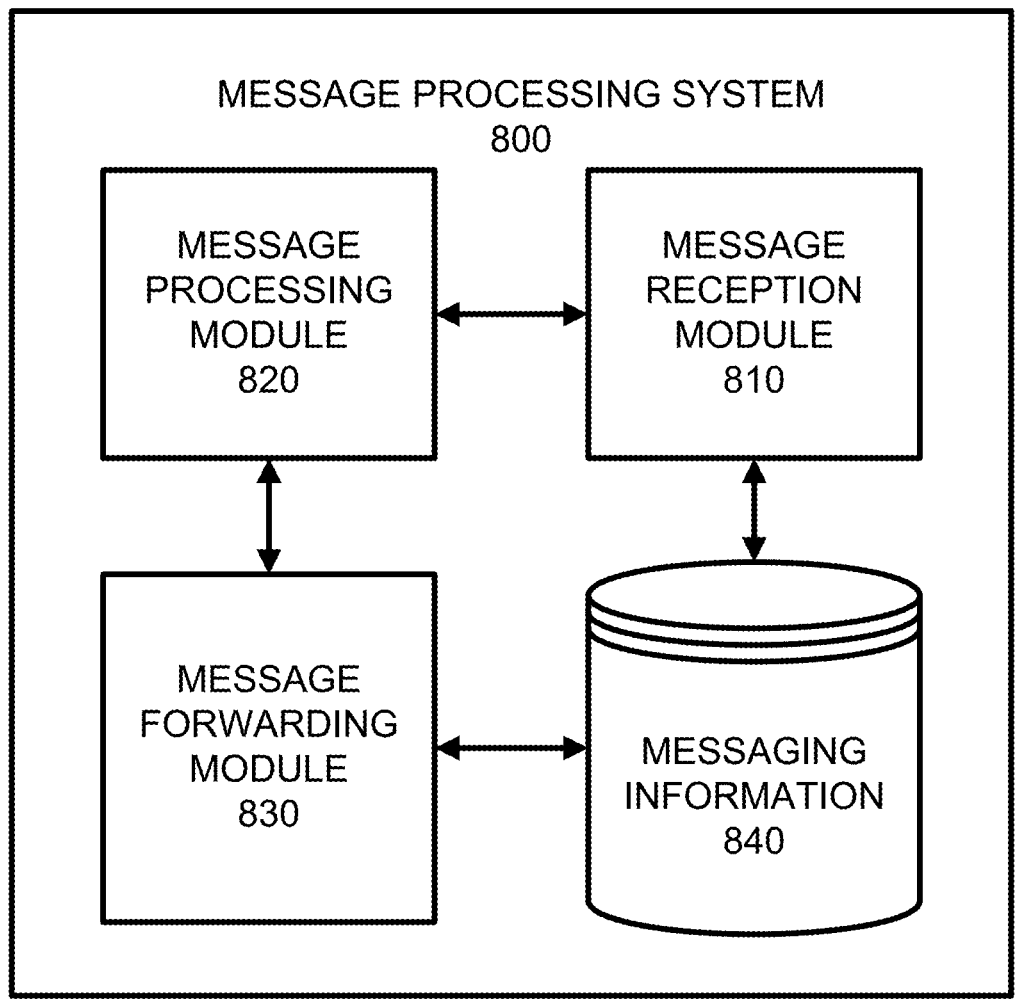
FIG. 8 illustrates an example message processing system configuration according to example embodiments.

FIG. 8 illustrates an example message processing system configuration according to example embodiments. The message processing system 800 includes at least a message reception module 810 to receive and forward messages to a processing module 820 which identifies the content of the messages and the relevance of those messages for action purposes. The message forwarding module 830 may be used to forward messages as they are created in response to actions taken for the message processing system 800. All message information is stored in the message repository 840 and retrieved and updated as needed.

Continuing with this example, a work order may be received in a workflow management application with many queues for processing the work order. The work order may include a variety of user requests, request items requiring approval by members of the internal service provider team, setup requests that need to be scheduled, dates, prices, promotions, etc. The information may be stored in the workflow management application memory and processed while being stored and forwarded among the various queues. At least one notification message can be generated and the at least one notification message can be transmitted to an active user interface associated with at least one queue among a plurality of queues of the workflow management application. The initial queue will generally store the work order and one or more workstations, personnel, computing devices may process one of many pending requests and pending items included in the work order and update the workflow management memory to identify the change to the work order that was performed. The plurality of queues are each configured to store and process the received work order according to the resources of each queue and the requirements of each work order.

One approach to processing the work order includes retrieving a record template, comparing the work order to the record template, and identifying a schedule for transmitting a notification message to the plurality of queues to initiate workflow processing measures. The process may also include initiating the change(s) to the work order while the work order is pending in a first queue, creating a modified work order including the changes made and appending the at least one change to the work order. The work order can receive an appendage message to the original content each time an item in the work order is processed. The appendage messages include information, such as when the item was processed, what queue (number or name) processed the item, the workstation representative or name associated with the item being processed, etc. The modified work order can be transferred to a second queue different from the first queue to process additional items that could not be processed by the first queue due to either the nature of the item to be processed and/or the workflow schedule limiting the amount of resources and/or time spent via a particular queue operating on that particular item. A new modified work order can be created to include additional changes to the modified work order as the next queue processes the one or more items in the queue. As a result, the new modified work order can be created to a final work order including an active status that can be shared with the end user and then the final work order can be transmitted to that user device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 9 illustrates an example network element 900, which may represent any of the above-described network components of the other figures.

Figure 9:
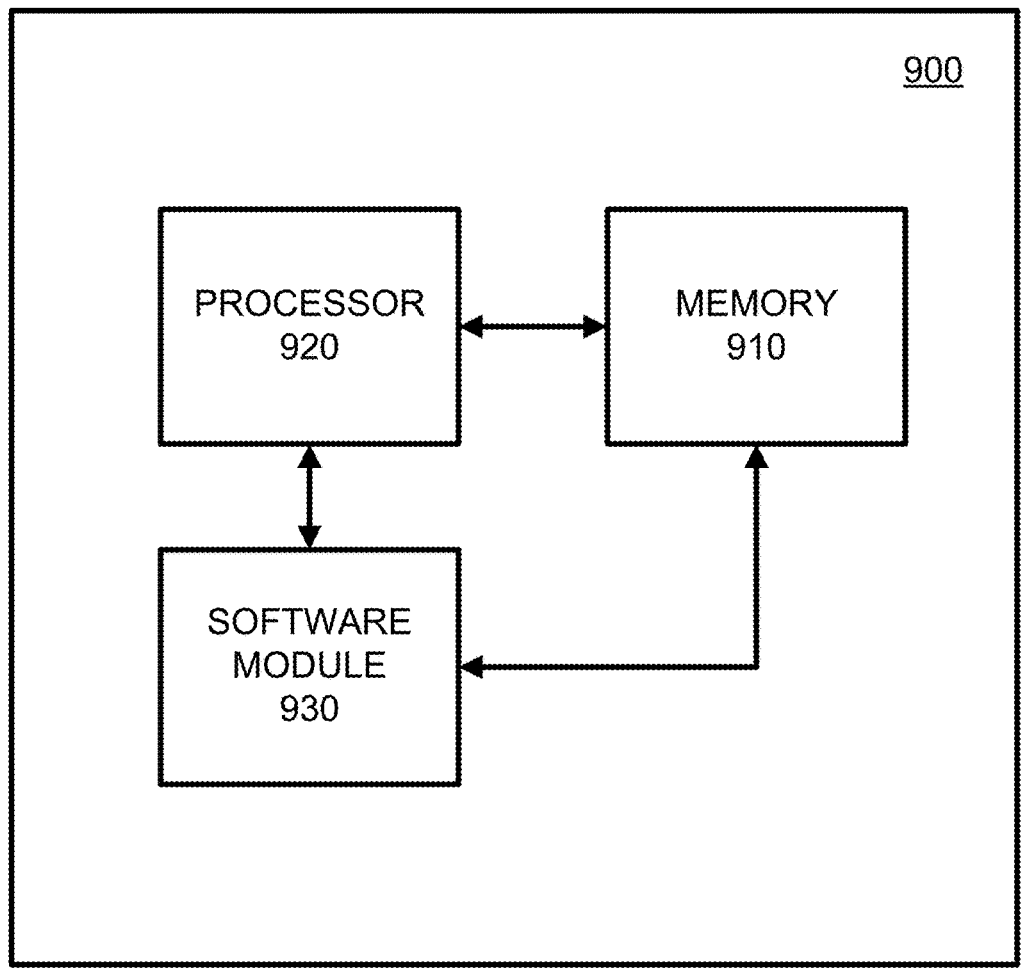
FIG. 9 illustrates an example network entity device configured to store instructions, software, and corresponding hardware for executing the same, according to example embodiments of the present application.

As illustrated in FIG. 9, a memory 910 and a processor 920 may be discrete components of the network entity 900 that are used to execute an application or set of operations. The application may be coded in software in a computer language understood by the processor 920, and stored in a computer readable medium, such as, the memory 910. The computer readable medium may be a non-transitory computer readable medium that includes tangible hardware components in addition to software stored in memory. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 8 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method of a service representative device, the method comprising:
   receiving, via a receiver, a request message from a customer device during a communication session between the customer device and the service representative device;
   identifying, via a processor, the request message as being a particular message type;
   pre-processing, via the processor, the request message based on the identified message type to identify message content and keywords included therein, wherein the keywords comprise an auto-identified purpose of the communication session; and
   forwarding, via the processor, the identified message content and the identified keywords to an active user interface of the service representative device and distinguishing the identified keywords from other message content on a screen of the active user interface thereby distinguishing the auto-identified purpose of the communication session from the other message content.

2. The method of claim 1, wherein the pre-processing comprises parsing the message content to identify at least one phrase of interest; and
   the forwarding comprises forwarding the at least one phrase of interest to the active user interface of the service representative device and distinguishing the at least one phrase of interest from other message content on the screen of the active user interface.

3. The method of claim 1, wherein the identifying comprises identifying an ongoing call from the customer device;
   the pre-processing comprises converting voice data from the ongoing call to text and pre-processing the text to identify at least one phrase of interest; and
   the forwarding comprises forwarding the phrase of interest to the active user interface of the service representative device during the ongoing call and distinguishing the at least one phrase of interest from other text from the ongoing call on the screen of the active user interface.

4. The method of claim 3, further comprising:
   retrieving a library comprising terms and phrases;
   comparing the at least one phrase of interest to the library terms and phrases;
   identifying at least one match between the at least one phrase of interest and the terms and phrases responsive to the comparing operation; and
   retrieving at least one active offer associated with the at least one match.

5. The method of claim 4, further comprising:
   creating an offer message with the at least one active offer;
   transmitting the offer message to the customer device; and
   receiving a feedback message from the customer device responsive to transmitting the offer message.

6. The method of claim 5, further comprising:
   parsing the feedback message and identifying an agreement or a disagreement with the at least one active offer; and
   creating a response message with a service suggestion associated with the at least one active offer.

7. The method of claim 1, wherein the particular message type comprises at least one of a voice message, a short message service message, and an email message.

8. The method of claim 1, wherein the auto-identified purpose of the communication session is identified during the communication session and forwarded to the active user interface of the service representative device while the communication session is still occurring.

9. An apparatus associated with a service representative device, the apparatus comprising:
   a receiver configured to receive a request message from a customer device during a communication session between the customer device and the service representative device;
   a processor configured to
      identify the request message as being a particular message type,
      pre-process the request message based on the identified message type to identify message content and keywords included therein, wherein the keywords comprise an auto-identified purpose of the communication session; and
   a transmitter configured to transmit the identified message content and the identified keywords to an active user interface of the service representative device to distinguish the identified keywords from other message content on a screen of the active user interface thereby distinguishing the auto-identified purpose of the communication session from the other message content.

10. The apparatus of claim 9, wherein the processor is further configured to parse the message content to identify at least one phrase of interest, and the transmitter is further configured to forward the phrase of interest to the active user interface of the service representative device to distinguish the at least one phrase of interest from other message content on the screen of the active user interface.

11. The apparatus of claim 9, wherein the processor is further configured to identify an ongoing call from the customer device, convert voice data from the ongoing call to text, pre-process the text to identify at least one phrase of interest, and the transmitter is further configured to forward the phrase of interest to the active user interface of the service representative device during the ongoing call to distinguish the at least one phrase of interest from other text from the ongoing call on the screen of the active user interface.

12. The apparatus of claim 11, wherein the processor is further configured to retrieve a library comprising terms and phrases, compare the at least one phrase of interest to the library terms and phrases, identify at least one match between the at least one phrase of interest and the terms and phrases responsive to the comparing operation, and retrieve at least one active offer associated with the at least one match.

13. The apparatus of claim 12, wherein the processor is further configured to create an offer message with the at least one active offer, the transmitter is further configured to transmit the offer message to the customer device, and the receiver is further configured to receive a feedback message from the customer device responsive to transmitting the offer message.

14. The apparatus of claim 13, wherein the processor is further configured to parse the feedback message and identify an agreement or a disagreement with the at least one active offer, and create a response message with a service suggestion associated with the at least one active offer.

15. The apparatus of claim 9, wherein the particular message type comprises at least one of a voice message, a short message service message and an email message.

16. A non-transitory computer readable storage medium configured to store instructions that when executed cause a processor associated with a service representative device to perform a method comprising:
   receiving a request message from a customer device during a communication session between the customer device and the service representative device;
   identifying the request message as being a particular message type;
   pre-processing the request message based on the identified message type to identify message content and keywords included therein, wherein the keywords comprise an auto-identified purpose of the communication session; and
   forwarding the identified message content and the identified keywords to an active user interface of the service representative device and distinguishing the identified keywords from other message content on a screen of the active user interface thereby distinguishing the auto-identified purpose of the communication session from the other message content.

17. The non-transitory computer readable storage medium of claim 16, wherein the pre-processing comprises parsing the message content to identify at least one phrase of interest; and
   the forwarding comprises forwarding the at least one phrase of interest to the active user interface of the service representative device and distinguishing the at least one phrase of interest from other message content on the screen of the active user interface.

18. The non-transitory computer readable storage medium of claim 16, wherein the identifying comprises identifying an ongoing call from the customer device;
   the pre-processing comprises converting voice data from the ongoing call to text and pre-processing the text to identify at least one phrase of interest; and
   the forwarding comprises forwarding the at least one phrase of interest to the active user interface of the service representative device during the ongoing call and distinguishing the at least one phrase of interest from other text from the ongoing call on the screen of the active user interface.

19. The non-transitory computer readable storage medium of claim 18, wherein the method further comprises:
   retrieving a library comprising terms and phrases;
   comparing the at least one phrase of interest to the library terms and phrases;
   identifying at least one match between the at least one phrase of interest and the terms and phrases responsive to the comparing operation; and
   retrieving at least one active offer associated with the at least one match.

20. The non-transitory computer readable storage medium of claim 19, wherein the method further comprises:
   creating an offer message with the at least one active offer;
   transmitting the offer message to the customer device; and
   receiving a feedback message from the customer device responsive to transmitting the offer message.

21. The non-transitory computer readable storage medium of claim 20, wherein the method further comprises:
   parsing the feedback message and identifying an agreement or a disagreement with the at least one active offer; and creating a response message with a service suggestion associated with the at least one active offer.

\* \* \* \* \*